United States Patent [19]

Dhyanchand

[11] Patent Number: 4,968,926
[45] Date of Patent: Nov. 6, 1990

[54] POWER CONVERSION SYSTEM WITH STEPPED WAVEFORM DC TO AC CONVERTER HAVING PRIME MOVER START CAPABILITY

[75] Inventor: P. John Dhyanchand, Rockford, Ill.

[73] Assignee: Sundstrand Corporation, Rockford, Ill.

[21] Appl. No.: 426,444

[22] Filed: Oct. 25, 1989

[51] Int. Cl.$^5$ .................. H02M 5/458; F02N 11/08
[52] U.S. Cl. .......................... 322/10; 322/59; 290/38 R; 290/46; 363/37; 363/49
[58] Field of Search .................. 322/10–12, 322/29, 59; 290/38 R, 46; 363/37, 43, 49, 64, 65, 71, 98, 132

[56] References Cited

U.S. PATENT DOCUMENTS

| | | | |
|---|---|---|---|
| 3,775,662 | 11/1973 | Compoly et al. | |
| 3,908,161 | 9/1975 | Messenger | 322/29 |
| 3,937,974 | 2/1976 | Lafuze | 290/46 |
| 4,481,459 | 11/1984 | Mehl et al. | 322/29 |
| 4,488,211 | 12/1984 | Miyairi | |
| 4,743,777 | 5/1988 | Shilling et al. | 322/29 |
| 4,786,852 | 11/1988 | Cook | 322/14 |
| 4,830,412 | 5/1989 | Raad et al. | 290/46 |
| 4,841,216 | 6/1989 | Okada et al. | 322/10 |
| 4,868,406 | 9/1989 | Glennon et al. | 322/29 |

Primary Examiner—Peter S. Wong
Attorney, Agent, or Firm—Marshall, O'Toole, Gerstein, Murray & Bicknell

[57] ABSTRACT

A power conversion system is operable in a generating mode to convert motive power developed by a prime mover into electrical power and in a starting mode to convert electrical power developed by a source of AC power into motive power for starting the prime mover. The system includes a stepped waveform inverter having a plurality of subinverters that are operable in the generating mode to produce rectangular waveforms wherein the waveforms are summed by a summing transformer to produce a stepped AC output waveform. During operation in the starting mode, the output of a rectifier bridge and an input of one of the subinverters are connected together by an interphase transformer. DC power is developed at a mid-tap of the interphase transformer and is delivered to the remaining subinverters which in turn develop AC power for operating a brushless generator as a motor.

10 Claims, 4 Drawing Sheets

GENERATE MODE

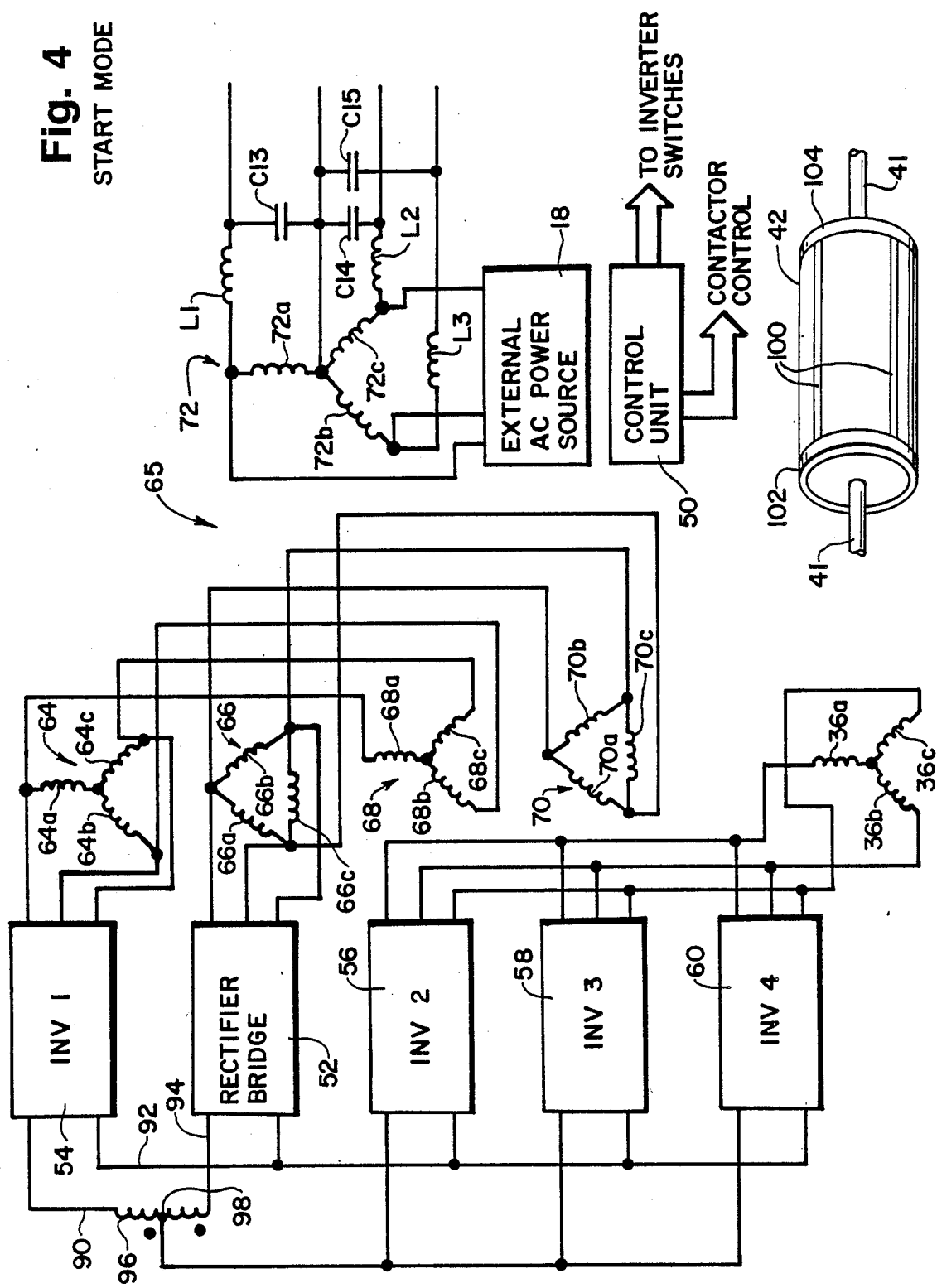
Fig. 4 START MODE

POWER CONVERSION SYSTEM WITH STEPPED WAVEFORM DC TO AC CONVERTER HAVING PRIME MOVER START CAPABILITY

TECHNICAL FIELD

The present invention relates generally to power conversion systems, and more particularly to such a system which may be used either in a generating mode to convert mechanical power developed by a prime mover into electrical power or in a starting mode to convert electrical power into motive power for starting the prime mover.

BACKGROUND

In a power conversion system such as a variable speed, constant frequency (VSCF) power generating system, a brushless, three-phase synchronous generator operates in a generating mode to convert variable speed motive power supplied by a prime mover into variable frequency AC power. The variable frequency power is rectified and provided over a DC link to a controllable static inverter. The inverter is operated to produce constant frequency AC power, which is then supplied over a load bus to one or more loads.

As is known, a generator can also be operated as a motor in a starting mode to convert electrical power supplied by an external AC power source into motive power which may in turn be provided to the prime mover to bring it up to self-sustaining speed. In the case of a brushless, synchronous generator including a permanent magnet generator (PMG), an exciter portion and a main generator portion mounted on a common shaft, it has been known to provide power at a controlled voltage and frequency to the armature windings of the main generator portion and to provide field current to the main generator portion via the exciter portion so that the motive power may be developed. This has been accomplished in the past, for example, using two separate inverters, one to provide power to the main generator portion armature windings and the other to provide power to the exciter portion. Thereafter, operation in the generating mode may commence whereupon DC power is provided to the exciter field winding.

A further way of operating a brushless, synchronous generator in a starting mode is disclosed in Dhyanchand, et al., U.S. patent application Ser. No. 07/421,640, filed Oct. 16, 1989 entitled "Brushless Generator Having Prime Mover Start Capability" and assigned to the assignee of the instant application, the disclosure of which is hereby incorporated by reference. The generator includes a rotor having a series of damper bars which are electrically connected to form a squirrel cage winding. During operation in the starting mode, power is applied to armature windings of the generator, in turn causing currents to flow in the damper bars and thereby causing the generator to operate as an induction motor. Such a starting system does not require position feedback for the inverter control, and hence the system is relatively simple in design.

Compoly, et al., U.S. Pat. No. 3,775,662 discloses a 24-step inverter having four inverter bridges which are coupled to four sets of primary windings of a summing transformer. The windings of these sets of primary windings are connected in a wye configuration and the windings of the remaining two sets are connected in a delta configuration. The transformer includes a set of secondary windings in which summed voltages are developed. The inverter bridges are operated at particular phase displacements with respect to one another to produce a 24-step, three-phase output.

Dhyanchand, et al., U.S. patent application Ser. No. 07/421,830, filed Oct. 16, 1989, entitled "Power Conversion System With Stepped Waveform DC/AC Converter Having Prime Mover Start Capability" discloses a power conversion system which is operable in generating and starting modes. The converter includes a rectifier bridge which is coupled to the output of a brushless, synchronous generator driven by a prime mover and first through fourth inverter bridges which are coupled to the output of the rectifier. First through fourth primary windings of a summing transformer are coupled to the outputs of the first through fourth inverter bridges, respectively. The windings of each of the first and third sets of primary windings are connected in a wye configuration whereas the windings of each of the second and fourth sets are connected in a delta configuration. The first through fourth inverters are operated to produce 24-step, constant frequency AC power in a secondary winding in the summing transformer. During operation in a starting mode, an external AC power source is coupled to the secondary winding of the summing transformer, the input of the rectifier bridge is coupled to the wye-connected primary windings and the outputs of the first and third inverters are coupled to armature windings of the generator. The first and third inverters are controlled to convert the DC power produced by the rectifier into AC power for causing the generator to operate as a motor and thereby develop the required motive starting power.

Other power conversion systems operable in generating and starting modes are disclosed in Cook, U.S. Pat. No. 4,786,852 (assigned to the assignee of the present application), Shilling, U.S. Pat. No. 4,743,777 and Messenger, U.S. Pat. No. 3,908,161.

SUMMARY OF THE INVENTION

In accordance with the present invention, an improved system is provided for the generation of AC power and for starting of a prime mover.

More particularly, a power conversion system utilizing a generator coupled to a prime mover and operable in generating and starting modes includes a rectifier having an input and an output, first and second inverters each having an input and output where the first inverter includes a plurality of switches and a plurality of flyback rectifiers coupled across the switches, a transformer including first and second sets of primary windings and a set of secondary windings wherein the first set of primary windings is coupled to the output of the first inverter and an interphase transformer having first and second ends and a mid-tap. Means are operable in the generating mode for coupling armature windings of the generator to the rectifier input, the rectifier output to the inputs of the first and second inverters and the output of the second inverter to the second set of primary windings. Such means are operable in the starting mode for coupling a source of AC power to the set of secondary windings, the second set of primary windings to the input of the rectifier, the output of the rectifier to the first end of the interphase transformer, the input of the first inverter to the second end of the interphase transformer, the mid-tap of the interphase transformer to the input of the second inverter and the output of the second inverter to the generator armature windings. Means are coupled to the inverters for operating same so that AC power produced by the generator in the generating mode is converted into DC power by the rectifier and the DC power is converted into fixed frequency AC power in the set of secondary windings by the inverters. Such means are also operable in the starting mode such that AC power induced in the first and second sets of primary windings due to application of AC power to the set of secondary windings is converted into DC power by the flyback rectifiers of the first inverter, the rectifier and the interphase transformer and the DC power is converted into AC power at a controlled frequency by the second inverter which is applied to the generator armature windings. The generator is thereby accelerated to produce motive power which is supplied to the prime mover.

In the preferred embodiment, the power conversion system further includes third and fourth inverters and third and fourth sets of primary windings coupled to the inverters in the generating mode wherein the inverters are operated to produce 24-step AC power in the set of secondary windings. During operation in the starting mode, the outputs of the second through fourth inverters are preferably connected in parallel to the generator armature windings. In such a case, the generator may be operated as an induction motor using the system disclosed in the Dhyanchand, et al. patent application referred to above and incorporated by reference herein. Alternatively, where the generator is to be operated as a brushless DC motor in the starting mode, one or more of the inverters may supply excitation to an exciter portion of the generator and the remaining inverters may supply power to the armature windings.

The power conversion system of the present invention results in the generation of 12-step harmonics in the power supplied by the external power source during starting. Such harmonics are easily filtered by a small and light input filter, and hence starting capability is obtained with only a modest increase in size and weight.

BRIEF DESCRIPTION OF THE DRAWINGS

FIG. 4 is a simplified combined schematic and block diagram of the electrical power converter and generator armature windings showing the interconnection of the power converter components during operation in the starting mode.

DESCRIPTION OF THE PREFERRED EMBODIMENT

Figure 1:
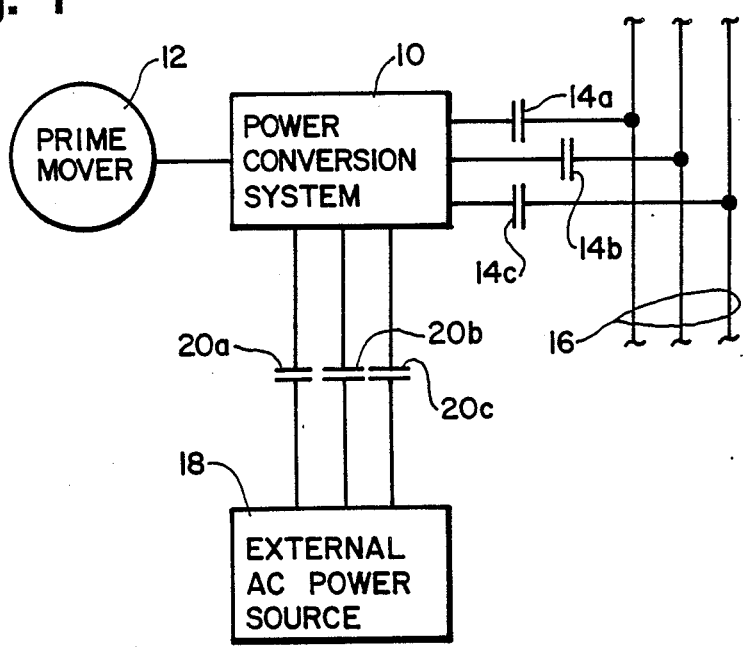
FIG. 1 a block diagram of a power generating system incorporating the power conversion system of the present invention.

Referring now to FIG. 1, a power conversion system 10 in the form of a variable speed, constant frequency (VSCF) system operates in a generating mode to convert variable speed motive power produced by a prime mover 12, such as an aircraft jet engine, into constant frequency three-phase AC electrical power which is delivered through controllable contactors 14a, 14b and 14c to a load bus 16. The VSCF system 10 is also operable in a starting mode using three-phase AC power produced by an external power source 18, such as a ground power cart. During operation in the starting mode, the power source 18 is coupled to the power conversion system 10 through controllable contactors 20a-20c. If necessary or desirable, the electrical power for use by the VSCF system 10 in the starting mode may be provided by another source of power, such as another VSCF system which is driven by a different prime mover. In any event, the VSCF system 10 converts electrical power into motive power when operating in the starting mode to bring the prime mover 12 up to self-sustaining speed. Once this self-sustaining speed (also referred to as "light-off") is reached, the prime mover 12 may be accelerated to operating speed, following which operation in the generating mode may commence.

Figure 2:
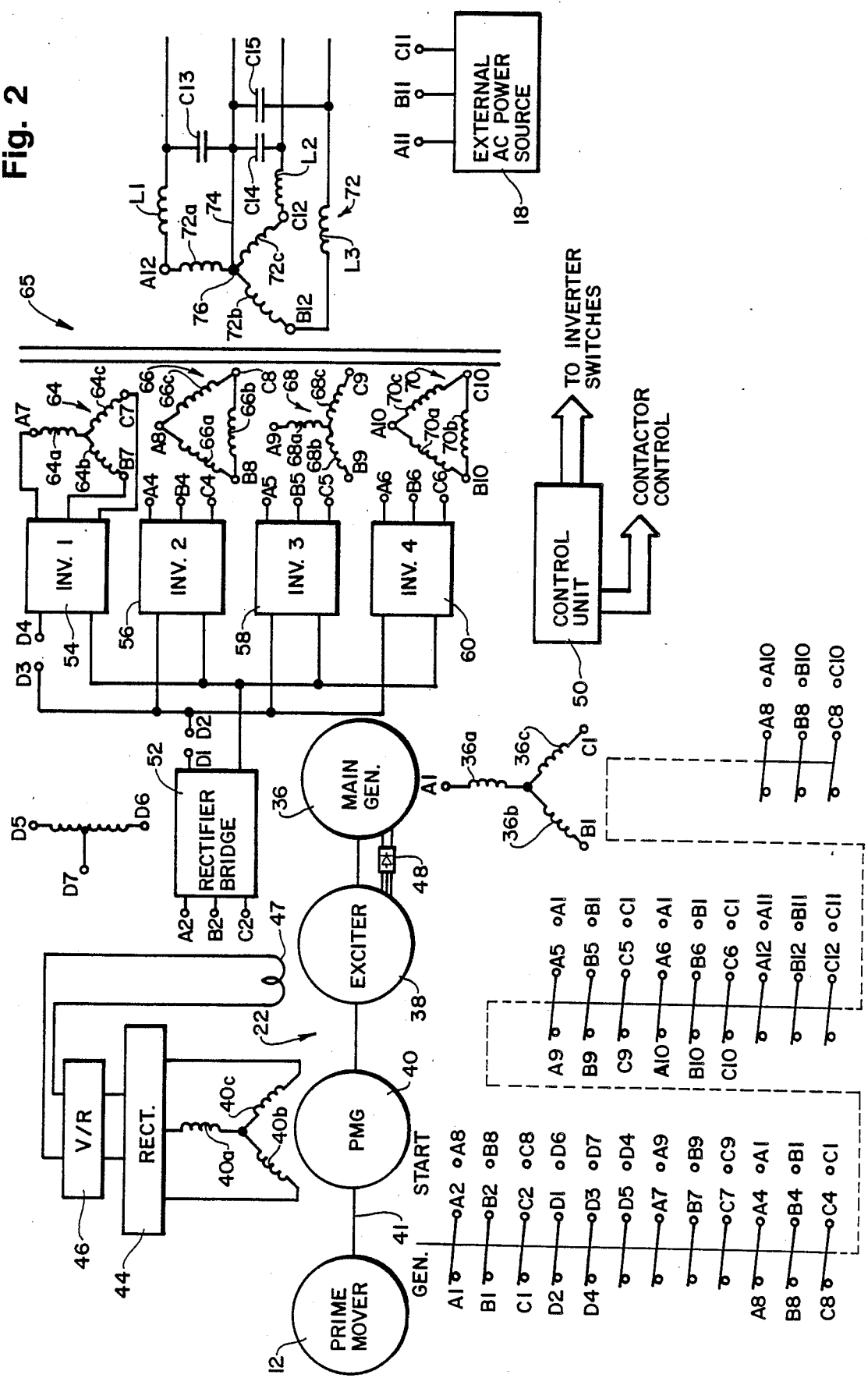
FIG. 2 is a simplified combined mechanical and electrical block diagram of the power generating system shown in FIG. 1.

Referring now to FIG. 2, the VSCF system 10 includes a generator 22 driven by the prime mover 12. Preferably, the generator 22 is of the brushless, synchronous type, although a different generator may be used, such as a permanent magnet generator.

The generator 22 includes a main generator portion 36 including three armature windings 36a, 36b, and 36c, an exciter portion 38 and a permanent magnet generator (PMG) 40, all of which include rotor structures mounted on a common shaft 41 of a rotor 42 illustrated in diagrammatic form in FIG. 4. In the generating mode of operation, rotation of the common shaft 41 by the prime mover 12 causes polyphase power to be developed in armature windings 40a, 40b and 40c which is in turn delivered to a rectifier 44 and a voltage regulator 46. The rectifier 44 and the voltage regulator 46 deliver a controlled magnitude of DC current to field winding 47 of the exciter 38. This current induces an AC voltage in armature windings (not shown) of the exciter 38 which is rectified by a rotating rectifier 48. The resulting DC power is supplied to a field winding (not shown) of the main generator portion 36. Rotation of the common shaft 41 while the field current is flowing in the field winding of the main generator portion 36 causes polyphase voltages to be developed in the armature windings 36a–36c. The frequency of these voltages varies with the speed of the shaft 41.

Figure 3:
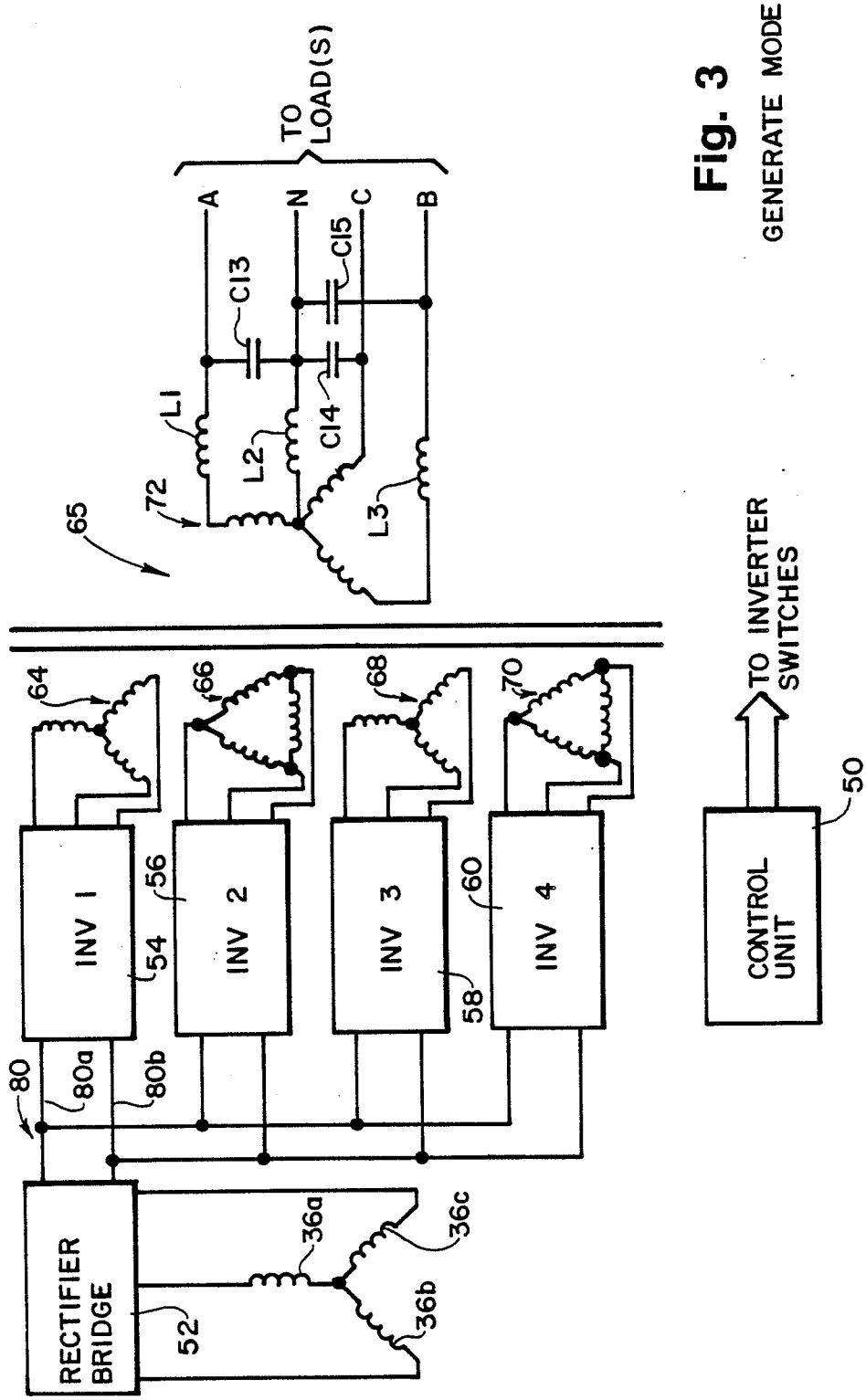
FIG. 3 is a simplified combined schematic and block diagram of the electrical power converter and generator armature windings illustrating the interconnection of the power converter components during operation in the generating mode.

The points of the system of FIG. 2 identified by the references A1-A12, B1-B12, C1-C12 and D1-D7 are interconnected by contactors represented by the single-pole, double-throw switches shown therein. The positions of the switches in FIG. 2 illustrate the interconnection of the components during operation in the generating mode and FIG. 3 illustrates the system in simplified form in such mode. During operation in the starting mode, the contactors are operated so that the switches are moved to the positions opposite those shown in FIG. 2. A simplified diagram of the system in this mode is illustrated in FIG. 4. The contactors represented by the switches are operated by a control unit 50 which may be implemented by a processor that executes programming to control the contactors. The actual contactors and programming executed by the control unit 50 are not illustrated in the Figures for the sake of simplicity, it being understood that the contactor arrangement and programming for controlling the contactors could readily be designed by one skilled in the art without undue experimentation.

Referring to FIGS. 2 and 3, during operation in the generating mode, the armature windings 36a–36c are connected to inputs of an AC/DC converter in the form of a rectifier bridge 52. Outputs of the rectifier bridge are connected to inputs of first through fourth three-phase inverters 54, 56, 58 and 60. An output of the first inverter 54 is connected to a first set of primary windings 64 of a summing transformer 65. In like fashion, outputs of the inverters 56, 58 and 60 are coupled to second through fourth sets of primary windings 66, 68 and 70 respectively. In the preferred embodiment, each of the first and third sets of primary windings 64, 68 includes three windings 64a–64c and 68a–68c which are connected together in a wye configuration. Each of the second and fourth sets of primary windings 66 and 70 includes three windings 66a–66c and 70a–70c which are connected together in a delta configuration. The sets of primary windings 64, 66, 68 and 70 are magnetically linked with a set of secondary windings 72 including three windings 72a–72c connected together in a wye configuration. The set of secondary windings 72 is coupled through an output filter including filter phase impedances L1–L3 and C13–C15 to the load bus 16 via the contactors 14a–14c. If necessary or desirable, a neutral line 74 may be connected between a neutral terminal 76 and the load bus 16 via an additional contactor (not shown).

As seen specifically in FIG. 3, during operation in the generating mode the DC power developed by the rectifier bridge 52 is provided on first and second conductors 80a, 80b of a DC link 80. The DC link 80 is coupled to first and second inputs of the inverters 54, 56, 58 and 60.

Figure 5:
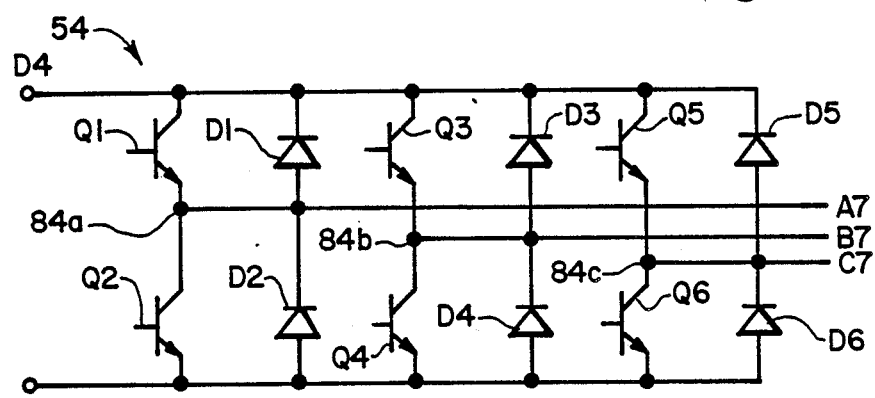
FIG. 5 is a simplified schematic diagram of the inverter 54 of FIG. 2.

FIG. 5 illustrates the inverter 54 in greater detail, it being understood that the remaining inverters 56, 58 and 60 are preferably identical thereto. It should be noted that the usual snubber circuits, DC link filter and other filtering components are not shown for the sake of simplicity. The inverter 54 includes six power switches in the form of bipolar transistors Q1–Q6 together with associated flyback rectifiers or diodes D1–D6, respectively. Phase outputs are produced at junctions 84a, 84b and 84c between series-connected power switches Q1 and Q2, Q3 and Q4 and Q5 and Q6, respectively. The switches of the inverters 54–60 are controlled in known fashion to produce three-phase, 24-step AC power in the set of secondary windings 72 of the summing transformer 65. The control unit 50 executes programming which in turn provides the appropriate base drive signals for the switches in the inverters 54–60. This programming is readily apparent to one skilled in the art, and hence will not be described in detail herein.

The 24-step power is filtered by the filter comprising the inductors L1–L3 and the capacitors C13–C15 to produce AC power which is substantially free of undesired harmonics.

As previously mentioned, during operation in the starting mode, the contactors are operated so that the switches are moved to the positions opposite those shown in FIG. 2. Thus, as seen FIG. 4, the outputs of the inverters 56–60 are connected in parallel with the armature windings 36a–36c of the main generator portion 36. Also, the external AC power source 18 is coupled directly to the set of secondary windings 72 of the transformer 65, the wye-connected sets of primary windings 64 and 68 are connected in parallel and the delta-connected sets of primary windings 66, 70 are connected in parallel. The parallel-connected sets of primary windings 64, 68 are coupled to the junctions 84a–84c of the inverter 54. The parallel-connected sets of primary windings 66, 70 are connected to the inputs of the rectifier bridge 52.

The AC power induced in the sets of primary windings 64–70 due to application of power to the secondary windings 72 is rectified by the flyback diodes D1–D6 of inverter 54 and by the rectifier bridge 52 to produce first DC power on conductors 90 and 92 and second DC power on conductors 94 and 92. The first and second DC powers are combined by an interphase transformer 96 having a first end coupled to the line 90, a second end coupled to the line 94 and a mid-tap 98 which is coupled to inputs of the inverters 56, 58 and 60. The combined DC power is converted by the inverters 56–60 into AC power which is supplied to the armature windings 36a–36c. More specifically, the inverters 56, 58 and 60 are operated to produce six-step AC outputs which are in phase so that the inverters 56, 58 and 60 are operated in parallel to provide power to the armature windings 36a–36c.

As seen in the diagrammatic illustration of FIG. 4, the rotor 42 preferably includes electrically conductive, axially extending damper bars 100 which are interconnected by electrically conductive end rings 102, 103 to form a squirrel cage winding. The application of AC power to the armature windings 36a–36c in turn induces currents in the damper bars 100 and the end rings 102, 104, causing the generator to operate as an induction motor so that it develops the motive power required for starting of the prime mover 12. Circuitry is preferably provided to periodically short out the main field winding during such operation to prevent damage thereto. A more complete description of the rotor construction for operating the generator as an induction motor in the starting mode is contained in the above-identified Dhyanchand, et al. patent application incorporated by reference herein.

During operation in the starting mode, 12-step harmonics are introduced into the power supplied by the external AC power source 18. These harmonics may be filtered by a small and light input filter coupled to the source 18.

If desired, the generator may alternatively be operated as a brushless DC motor during operation in the starting mode. In this case, excitation must be provided to the main generator portion field winding via the exciter 38. This may be accomplished by providing AC power to separate AC field windings of the exciter during the time that the speed of the shaft 41 is at or near zero and thereafter providing DC power to the exciter field winding 47. In this case, the AC power may be supplied by one or more of the inverters 56, 58 and 60 and the remaining inverters may be connected in parallel to the generator armature windings 36a–36c.

It should be noted that the starting system of the present invention is not limited to use with a 24-step power conversion system. In fact, a 36-step inverter system which utilizes six inverters or a system which uses a different number of inverters may be used, if desired.

I claim:

1. A power conversion system utilizing a generator having armature windings and coupled to a prime mover wherein the power conversion system is operable in a generating mode to convert motive power developed by the prime mover into electrical power and in a starting mode to convert electrical power developed by a source of AC power into motive power for starting the prime mover, comprising:

a rectifier having an input and an output;

first and second inverters each having an input and an output and including a plurality of switches and a plurality of flyback rectifiers coupled across the switches;

a transformer including first and second sets of primary windings and a set of secondary windings wherein the first set of primary windings is coupled to the output of the first inverter;

an interphase transformer having first and second ends and a mid-tap; and means operable in the generating mode for coupling the rectifier input to the generator armature windings, the inputs of the first and second inverters to the rectifier output and the second set of primary windings to the second inverter output and operable in the starting mode for coupling the source of AC power to the set of secondary windings, the second set of primary windings to the input of the rectifier, the output of the rectifier to the first end of the interphase transformer, the input of the first inverter to the second end of the interphase transformer, the mid-tap of the interphase transformer to the input of the second inverter and the output of the second inverter to the generator armature windings; and means coupled to the inverters for operating same so that AC power produced by the generator in the generating mode is converted into DC power by the rectifier and the DC power is converted into fixed frequency AC power by the inverters which is developed in the set of secondary windings and so that AC power induced in the first and second sets of primary windings due to application of AC power to the set of secondary windings is converted into DC power by the flyback rectifiers of the first inverter, the rectifier and the interphase transformer and the DC power is converted into AC power at a controlled frequency by the second inverter which is applied to the generator armature windings.

2. The power conversion system of claim 1, wherein the first set of primary windings are connected in a wye configuration.

3. The power conversion system of claim 1, wherein the second set of primary windings are connected in a delta configuration.

4. The power conversion system of claim 1, wherein the operating means includes means for causing the inverters to produce a stepped AC waveform in the set of secondary windings during operation in the generating mode.

5. A power conversion system utilizing a generator having armature windings and coupled to a prime mover wherein the power conversion system is operable in a generating mode to convert motive power developed by the prime mover into electrical power and in a starting mode to convert electrical power developed by a source of AC power into motive power for starting the prime mover, comprising:

a rectifier bridge having an input and an output;

first, second, third and fourth inverters each having an input and an output and including a plurality of switches and a plurality of flyback rectifiers coupled across the switches;

a transformer including first, second, third and fourth sets of primary windings and a set of secondary windings wherein the first set of primary windings is coupled to the output of the first inverter;

an interphase transformer having first and second ends and a mid-tap; and means operable in the generating mode for coupling the rectifier input to the generator armature windings, the inputs of the first through fourth inverters to the rectifier output and the second through fourth sets of primary windings to the outputs of the second through fourth inverters, respectively, and operable in the starting mode for coupling the source of AC power to the set of secondary windings, the third set of primary windings to the output of the first inverter, the second and fourth sets of primary windings to the input of the rectifier bridge, the output of the rectifier bridge to the first end of the interphase transformer, the input of the first inverter to the second end of the interphase transformer, the mid-tap of the interphase transformer to the inputs of the second through fourth inverters and the output of the second inverter to the generator armature windings; and means coupled to the inverters for operating same so that AC power produced by the generator in the generating mode is converted into DC power by the rectifier and the DC power is converted into fixed frequency AC power by the inverters which is developed in the set of secondary windings and so that AC power induced in the sets of primary windings due to application of AC power to the set of secondary windings in the starting mode is converted into DC power by the flyback rectifiers of the first inverter, the rectifier bridge and the interphase transformer and the DC power is converted into AC power at a controlled frequency by the second inverter which is applied to the generator armature windings.

6. The power conversion system of claim 5, wherein the generator includes a set of damper bars disposed on a rotor of the generator and wherein the coupling means further includes means for connecting the outputs of the third and fourth inverters in parallel with the output of the second inverter during operation in the starting mode wherein currents are induced in the damper bars so that the generator is operated as an induction motor in such mode.

7. The power conversion system of claim 5, wherein the generator is of the brushless type .having a main generator portion and an exciter portion each having a field winding and the exciter having an armature winding coupled to the main generator portion field winding and wherein the output of one of the third and fourth inverters is coupled to the exciter portion field winding and the other of the third and fourth inverters is coupled to the generator armature windings whereby the generator is operated as a brushless DC motor.

8. The power conversion system of claim 5, wherein each of the first and third sets of primary windings includes windings connected in a wye configuration.

9. The power conversion system of claim 5, wherein each of the second and fourth sets of primary windings includes windings connected in a delta configuration.

10. The power conversion system of claim 5, wherein the operating means includes means for causing the inverters to produce a 24-step AC waveform in the set of secondary windings in the generating mode.

* * * * *